United States Patent [19]

Crutchfield

[11] 4,327,189

[45] Apr. 27, 1982

[54] REVERSIBLE DEFLOCCULATION OF CLAY SLURRIES

[75] Inventor: Marvin M. Crutchfield, Creve Coeur, Mo.

[73] Assignee: Monsanto Company, St. Louis, Mo.

[21] Appl. No.: 156,703

[22] Filed: Jun. 5, 1980

[51] Int. Cl.$^3$ ............................................. C09C 1/42
[52] U.S. Cl. ...................................... 501/148; 209/5; 210/698
[58] Field of Search .................. 106/72, 288 B; 209/5; 210/698, 701

[56] References Cited

U.S. PATENT DOCUMENTS

| | | | |
|---|---|---|---|
| 3,737,333 | 6/1973 | Sawyer | 209/5 |
| 3,856,755 | 12/1974 | Vogt et al. | 210/698 |
| 4,144,226 | 3/1979 | Crutchfield et al. | 528/243 |
| 4,186,027 | 1/1980 | Bell et al. | 209/5 |

FOREIGN PATENT DOCUMENTS

| | | | |
|---|---|---|---|
| 770256 | 3/1957 | United Kingdom | 209/5 |
| 1480420 | 7/1977 | United Kingdom | 106/72 |

*Primary Examiner*—Peter A. Hruskoci
*Attorney, Agent, or Firm*—S. M. Tarter; W. H. Duffey; R. C. Griesbauer

[57] ABSTRACT

Various clay substances, such as kaolin, can be reversibly deflocculated by treating the flocculant clay slurry with a deflocculating amount of a polymer having the general formula:

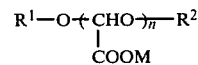

wherein n averages at least 4; M is selected from the group consisting of alkali metals, ammonium, and alkanol amine groups having from 1 to about 4 carbon atoms; $R^1$ and $R^2$ are individually any chemically stable group which stabilizes the polymer against rapid depolymerization in alkaline solution. When the polymer depolymerizes, the clay slurry will reflocculate under agitated or quiescent conditions. The length of time that the slurry remains fluid depends on the pH, the concentration of the polymer, and the hydrolytic stability of the polymer.

11 Claims, No Drawings

REVERSIBLE DEFLOCCULATION OF CLAY SLURRIES

BACKGROUND OF THE INVENTION

This invention relates to the deflocculation of clay slurries and more specifically to an improved method for the controlled deflocculation and reflocculation of clay slurries using an acetal carboxylate polymer.

Clays are generally considered by those skilled in the art to be plastic, soft, variously colored earths formed by the decomposition of aluminum minerals. In true clay, about 30 percent of weight of the solid particles have a diameter less than about 0.002 millimeters. Such clays are widely used for the manufacture of ceramics for industrial and domestic uses. Of the various clays, typical examples include quartz feldspar, kaolin, montmorillonite, siderite and the like.

In the mining of various clays, such as kaolin, the clay is contacted with water and a small amount of a deflocculating agent is added, such as tetraalkali metal pyrophosphate, alkali metal tripolyphosphate and the like, to form a thin slurry of the clay in water. The clay is normally reflocculated by the addition of a strong mineral acid and/or aluminum sulfate, thus reducing the pH of the slurry and causing the fluid slurry to reflocculate.

Although satisfactory results are achieved by the prior art processes, it has now been found that clays can be deflocculated and reflocculated as a function of time without the necessity of adding acid. The elapsed time between deflocculation and reflocculation is controlled by the selection of a particular acetal carboxylate polymer end group and the pH of the slurry. The polymers useful in the process of the present invention are known to the art and are described in U.S. Pat. No. 4,144,226 issued Mar. 13, 1979.

By contrast, prior art processes using alkali metal phosphates will deflocculate the clay slurry, and such phosphates will hydrolyze over a long period of time, permitting the clay slurry to reflocculate. However, reflocculation cannot be controlled as a function of time, but rather, an acid must be admixed with the slurry to lower the pH and reflocculate the clay. Now, according to the present invention, clays can be deflocculated and reflocculated over a period of time without the necessity of mixing acid to adjust the pH of the deflocculated clay slurry. It will be seen by those skilled in the art that a significant improvement has been made by the process of the present invention for the deflocculation and reflocculation of clays, since reflocculation occurs spontaneously but at a controlled rate. By the present process, the clay slurry can reflocculate, even in a quiescent state, permitting the clay slurry to be used in papermaking applications where agitation is used, or to cast the deflocculated slurry in a mold and then reflocculating in a quiescent state to form green ceramic ware for industrial and domestic applications.

SUMMARY OF THE INVENTION

These and other advantages are achieved by a method for the reversible deflocculation by clay slurries which comprises:

(a) contacting the clay slurry with a sufficient amount to deflocculate the clay slurry of a polymer having the general formula:

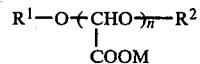

wherein n averages at least 4; M is selected from the group consisting of alkali metals, ammonium and alkanol amine groups having from 1 to about 4 carbon atoms; $R^1$ and $R^2$ are individually any chemically stable group which stabilizes the polymer against rapid depolymerization in alkaline solution, $R^1$ and $R^2$ being selected to provide substituents on the carbon atom next to the polymer backbone that are more electron withdrawing as the hydrolytic stability of the polymer increases;

(b) controlling the length of time that the clay is deflocculated by adjusting the pH and selection of $R^1$ and $R^2$.

For the purposes of this invention, the term "rapid depolymerization in alkaline solution" as it is used in the specification and claims shall mean that in an aqueous solution of 0.5 molar sodium hydroxide containing 10 grams per liter of the acetal carboxylate polymer, the average chain length of the acetal carboxylate polymer will be reduced by more than 50 percent, as determined by Proton Magnetic Resonance, after 1 hour at 20° C.

Broadly described, the acetal carboxylate polymer useful in the process of the present invention can be prepared according to the teachings of U.S. Pat. No. 4,144,226 issued Mar. 13, 1979. The polymer is prepared by bringing together under polymerization conditions a glyoxylate ester and a polymerization initiator and adding to the termini of the resulting polymer a chemically stable group to stabilize the polymer against rapid depolymerization in alkaline solution. To prepare the polymer salt useful in the process of the present invention, the stabilized polymer can be saponified with an alkali metal hydroxide to form the corresponding alkali metal salt. The alkali metal salt can be converted to the ammonium or alkanol amine salt by conventional ion exchange techniques. The alkali metal salts, especially the sodium salts, are preferred.

It is important in the process of the present invention that the acetal carboxylate polymer contain a sufficient number of acetal carboxylate segments to effectively deflocculate the clay. It has been found that when n averages less than about 4, effective deflocculation is difficult to achieve. On the other hand, when n is greater than about 200, a functional increase in deflocculation is not achieved although the use of polymers wherein n averages greater than 200 is not harmful. It is preferred that n averages between about 20 and about 200, and it is especially preferred that n averages between about 50 and about 100.

As is known to those skilled in the art, any number of chemically reactive groups can be added to the polymer termini to stabilize the polymer against rapid depolymerization in an alkaline solution. As an example, suitable chemically stable end groups include stable substituent moieties derived from otherwise stable compounds such as: alkanes, such as methane, ethane, propane, butane and higher alkanes such as decane, dodecane, octadecane and the like; alkenes such as ethylene, propylene, butylene, decene, dodecene and the like; branched chain hydrocarbons, both saturated and unsaturated, such as 2-methyl butane, 2-methyl butene, 4-butyl-2,3-dimethyl octane and the like; aromatic hydrocarbons such as benzene, toluene, xylene and the like; cycloalkanes and cycloalkenes such as cyclohexane and cyclohexene and the like; alcohols such as methanol, ethanol, 2-propanol, cyclohexanol, and the like; polyhydric alcohols such as 1,2-ethane diol, 1,4-benzene diol and the like; ethers such as methoxyethane methyl ether, ethyl ether, ethoxy propane and cyclic ethers such as ethylene oxide, epichlorohydrin, tetramethylene oxide and the like. The above listing is intended to be instructive and is not intended to be limiting since other chemically stable end groups that stabilize the polymer against rapid depolymerization in an alkaline solution will occur to those skilled in the art.

The selection of the end group is important in the method of the present invention since substantial variations in hydrolytic stability of the polymer can be achieved by rather modest variations in the structure of the end group, and the exact number of repeating units in the acetal carboxylate polymer chain does not significantly affect the hydrolytic stability of the polymer.

substituents $R^4$ and $R^5$ having the most positive sigma value will hydrolyze slowest.

The relative hydrolytic stability can best be illustrated using three different polymers stabilized with different end group structures, wherein $R^5$ in all cases is H for purposes of simplicity. When the polymer is stabilized by end groups derived from dialkyl sulfate, $R^3$ is alkyl, preferably 1 to about 4 carbon atoms, and $R^4$ is —COOM. When the polymer is stabilized using an end group derived from methyl or ethyl vinyl ether, $R^3$ is methyl or ethyl and $R^4$ is methyl. When the end group is derived from dimethoxymethane, $R^3$ is methyl and $R^4$ is hydrogen.

These acetal carboxylate polymer end groups are listed in Table 1 in order of decreasing hydrolytic stability. The Hammet-Sigma functions ($\sigma_p$) were obtained from J. March, "Advanced Organic Chemistry", McGraw-Hill Book Company, New York, N.Y. (1968), page 241.

TABLE 1

| End Group | $R^4$ | $R^3$ | $R^4\sigma_p$ |
|---|---|---|---|
| —C(H)(COONa)—O—CH$_3$ | —COONa | —CH$_3$ | 0.13 |
| —C(H)(COONa)—O—CH$_2$CH$_3$ | —COONa | —C$_2$H$_5$ | 0.13 |
| —C(H)(COONa)—O+CH$_2$CH$_2$O$)_{n-3}$H | —COONa | +CH$_2$CH$_2$O$)_{n-3}$H | 0.13 |
| —C(H)(H)—O—CH$_3$ | —H | —CH$_3$ | 0 |
| —C(H)(H)—O—CH$_2$CH$_3$ | —H | —C$_2$H$_5$ | 0 |
| —C(H)(CH$_3$)—O—CH$_3$ | —CH$_3$ | —CH$_3$ | −0.13 |
| —C(H)(CH$_3$)—O—CH$_2$CH$_3$ | —CH$_3$ | —C$_2$H$_5$ | −0.13 |

The relative stability of the polymer at a given pH can be predicted by expressing the end group structure as:

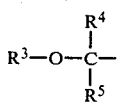

wherein $R^4$ and $R^5$ are the substituents on the acetal carbon atom nearest to the terminus of the stabilized polymer and $R^3$ is a moiety representing the remainder of the end group. With this formula the sigma value of the substituents $R^4$ and $R^5$ can be determined or estimated from standard references. The Hammet or Taft substituent constants (i.e., sigma values) of representative groups can be found in many physical chemistry textbooks. Among several different acetal carboxylate polymers, the order of hydrolytic stability will tend to be such that the one with end groups in which the substituents on the acetal carbon atom nearest the terminus of the polymer, $R^4$ and $R^5$, having the most negative substituent constant (sigma value) will hydrolyze fastest, and the polymer with end groups in which the It can be seen that when $R^3$ is held constant, the variation in $R^4$ from —COONa to —CH$_3$ affects the hydrolytic stability since a polymer end group substituent $R^4\sigma_p$ of +0.13 is more hydrolytically stable than a substituent $R^4\sigma_p$ of −0.13. However, $R^3$ has much less effect than the effect from $R^4$.

Hence, an acetal carboxylate polymer can be prepared with a wide range of hydrolytic stabilities to make the polymer useful for either fast or slow reversible deflocculation of clays. Numerous other end groups derived from stable compounds can be added to the polymer termini and the relative hydrolytic stability can be determined. Also, other factors in addition to the end group such as temperature, pH, steric hindrances and the like, affect hydrolytic stability. However, for the reversible deflocculation of any particular clay an acetal carboxylate polymer can be tested and the hydrolytic stability can be controlled within certain limits by modification of the end group structure. The optimum end group structure to provide an acetal carboxylate polymer having the desired hydrolytic stability for a given application can be confirmed by routine experimentation.

In order to be useful for the reversible deflocculation of clays, the acetal carboxylate polymer must be stabilized against rapid depolymerization in alkaline solution. For example, the polymer is not stable against depolymerization in alkaline solution when $R^4$ is —COOM and $R^3$ is hydrogen, and polymers that are not stable against rapid depolymerization in alkaline solution are outside the scope of the present invention.

After the polymer has been added to the clay and water to deflocculate the clay, the time that the slurry remains in the liquid state can be varied within wide limits by controlling the initial pH of the clay slurry. For example, when $R^4$ is —COOM and $R^3$ is methyl, a 60 percent kaolin slurry having a consistency of mayonnaise and an initial pH of about 6 can be rapidly deflocculated to a liquid slurry by the addition of 0.03 percent of the polymer. The slurry will remain in the liquid state for about 23 days at this pH. However, under the same conditions when the slurry has an initial pH of about 2, the liquid slurry containing the deflocculated kaolin spontaneously reflocculates to its original state in less than one hour. It can be seen that the acidity of the slurry affects the hydrolytic stability of any given polymer, and hence, the length of time before the slurry spontaneously reflocculates to its original state. The length of time that the slurry remains deflocculated can be controlled for any given polymer by adjusting the initial pH of the slurry to between about pH 2 and about pH 9. Best results are usually achieved by adjusting the initial pH of the slurry to between about pH 3 and about pH 7. The optimum pH to reversibly deflocculate any particular clay slurry using a given polymer can be determined by routine experimentation.

The concentration of the acetal carboxylate polymer in the process of the present invention can vary within wide limits. As little as 0.01 percent acetal carboxylate polymer, based on the weight of the dry clay, is sufficient to reversibly deflocculate the clay. However, the use of greater than about 1 percent acetal carboxylate polymer, based on the weight of the dry clay, does not appear to provide additional benefits and indeed may not be cost effective. It is preferred to use between about 0.03 percent and about 0.3 percent, based on the weight of the dry clay.

The pH of the clay slurry and the concentration of the acetal carboxylate polymer are interrelated and the length of the time that the clay slurry is in a liquid state can be controlled to some degree by the concentration of the acetal carboxylate polymer. For example, if a slightly longer time is desired before reflocculation occurs and the kaolin slurry returns to its original plastic state, a small additional amount of the acetal carboxylate polymer can be added to the slurry. Conversely, if it is desired to cause the kaolin slurry to reversibly deflocculate in a shorter period of time, slightly less acetal carboxylate polymer can be used. The optimum amount of acetal carboxylate polymer along with pH and the appropriate end groups can readily be determined by those skilled in the art through routine experimentation in light of the present disclosure.

DESCRIPTION OF THE PREFERRED EMBODIMENTS

This invention is illustrated by but not limited to the following Examples wherein all percentages are by weight unless otherwise stated.

EXAMPLE I

A. Preparation of Methyl Glyoxylate

A 2-liter, 4-necked, round bottom flask equipped with an overhead stirrer, thermometer and 30 centimeter Vigreaux column and take-off head is charged with 1200 grams (10 moles) of methyl glyoxylate methyl hemiacetal. A total of 568 grams of phosphorus pentoxide (4 moles) is added in 4–6 portions keeping the reaction temperature below 90° C. The addition requires about 90 minutes. When the addition is complete the mixture is stirred until the temperature has fallen to about 70° C. (0.5 hour). The mixture is distilled at aspirator vacuum (20–40 torr) yielding 764 grams crude methyl glyoxylate having a boiling point of 56°–61° C. The distillation is stopped when the pot temperature reaches 125° C. since a violent decomposition may occur at higher temperatures. Chromatographic analysis of this crude material indicates 86.6 percent glyoxylate, 9.3 percent methyl dimethoxy acetate, 3.3 percent dimethyl oxalate, and trace amounts of unidentified products.

The crude product is then distilled from 25 grams of 3A molecular sieves which have been heated to about 250° C. to drive off residual moisture and organics, through the Vigreaux column. A 15-gram forecut of about 97 percent pure glyoxylate is collected initially. The Vigreaux column is replaced by a 30 centimeter Widmer column and 521 grams of 99 percent pure polymerizable grade methyl glyoxylate is collected having a boiling point of 83°–84° C. at 210 torr. A final cut of 36 grams (93 percent pure) ester is collected in a final fraction (91°–94° C.; 210 torr). The overall yield of polymerizable glyoxylate is 59 percent from the hemiacetal.

B. Preparation of Polymer

To a 200 milliliter, 3-necked, round bottom flask equipped with an efficient stirrer and thermometer were added 36 grams of glyoxylate ester from Section A above (0.4 mole) and 9 milliliters of methylene chloride. The mixture was cooled to about 0° C. and then 300 microliters of 0.05 molar sodio dimethyl methyl malonate in tetrahydrofuran were added. The temperature rose to about 33° C. The mixture was cooled to 0° C. and stirred at that temperature for about 1 hour. The 5-gram portions were taken and separately stabilized using a variety of chemically stable end groups. The reagent to provide the chemically stable end group and the identification of the end groups are shown in Table 2. In all cases, the temperature at the beginning of adding the reagent and catalyst was maintained at 0° C. and the resulting polymer had a chain length of about 50 repeating units.

TABLE 2

| | REAGENT | $R^1$ | $R^2$ |
|---|---|---|---|
| $CF_3COOH$ | Ethyl Vinyl Ether | H<br>$CH_3C-$<br>\|<br>$OCH_2CH_3$ | H<br>$-C-CH_3$<br>\|<br>$OCH_2CH_3$ |
| NaH | Dimethyl-sulfate | $H_3COC-$<br>\|<br>$COOM$ | $-COCH_3$<br>\|<br>$COOM$ |
| $P_2O_5$ | Dimethoxy-methane | $H_3C-O-CH_2-$ | $-CH_2-O-CH_3$ |

C. Saponification

Each of the runs in Section B was poured into about 30 milliliters of 2 molar sodium hydroxide and stirred for about 5 minutes. Each mixture was washed 3 times with saturated sodium bicarbonate solution. Then there were added with cooling and stirring about 13 milliliters of 10 normal NaOH solution. Each mixture was stirred for two hours and then about 20 milliliters of methanol were added. The solutions were stirred for about 30 minutes and the precipitates were each collected on sintered glass funnels. Each precipitate was washed twice with methanol and twice with diethyl ether and dried for one hour on the sintered glass funnels using aspirator vacuum.

EXAMPLE II

Each of the acetal carboxylate polymers prepared in Example I was tested as a defloculant for a viscous kaolin slurry by mixing 0.1 gram of the acetal carboxylate polymer to 100 grams of the kaolin slurry. In each case, the acetal carboxylate polymer defloculated the kaolin as indicated by a dramatic change in viscosity from a thick gel having a pH of about 6 to that of a pumpable slurry having a viscosity slightly higher than that of water. The kaolin remained defloculated for a period of time, depending upon the hydrolytic stability of the acetal carboxylate polymer. When the polymer depolymerized, the pumpable slurry rapidly converted back to a flocculated state. The time that the kaolin was defloculated was measured and compared to the Hammet-Sigma function of the end group on the acetal carboxylate polymer. The results are presented in Table 3.

TABLE 3

KAOLIN DEFLOCCULATION TIME AS A FUNCTION OF END GROUP STRUCTURE AT pH 6

| POLYMER END GROUP | $R^4$ | $R^3$ | $R^4\sigma_p$ | KAOLIN DEFLOCCU- LATION TIME |
|---|---|---|---|---|
| H | —CH$_3$ | —C$_2$H$_5$ | −0.13 | 2 minutes |
| —C—OC$_2$H$_5$ <br> \| <br> CH$_3$ | | | | |
| —CH$_2$—OCH$_3$ | H | —CH$_3$ | 0 | 4 days |
| —CH—OCH$_3$ <br> \| <br> COONa | —COONa | —CH$_3$ | +0.13 | 23 days |

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. As an example, the present process has been illustrated using a homopolymer, which is preferred. However, the acetal carboxylate polymer can optionally contain other polymer fragments and accordingly the polymer can be a linear homopolymer or copolymer, or it can be branched. To form a copolymer wherein the copolymer is randomly distributed along the polymer chain, each mole of glyoxylate ester is polymerized with up to two moles of any number of comonomers known to those skilled in the art. Suitable comonomers include epoxy compounds, aldehydes and the like. It is only necessary that the comonomer does not cause the polymer to depolymerize in alkaline solution, or interfere with the deflocculation of the clay. Accordingly, modifications are contemplated which can be made without departing from the spirit of the described invention.

What is claimed is:

1. A method for the controlled defloculation and refloculation of clay slurries having a pH between about pH2 and about pH9 which comprises contacting the clay slurry with a sufficient amount to defloculate the clay slurry of a polymer having the general formula:

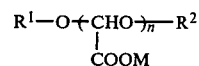

wherein n averages at least 4; M is selected from the group consisting of alkali metals, ammonium and alkanol amine groups having from 1 to about 4 carbon atoms; and $R^1$ and $R^2$ are individually any chemically stable group which stabilizes the polymer against rapid depolymerization in alkaline solution; and (b) refloculating said clay slurry when said polymer depolymerizes.

2. A method of claim 1 wherein n averages between about 10 and about 200.

3. A method of claim 1 wherein n averages between about 50 and about 100.

4. A method of claim 2 or 3 wherein M is an alkali metal.

5. A method of claim 2 or 3 wherein M is sodium.

6. A method of claim 1 or 2 wherein the amount of polymer is at least 0.01 weight percent, based on the weight of the clay.

7. A method of claim 1 or 2 wherein the amount of polymer is between about 0.03 weight percent and about 0.3 weight percent, based on the weight of the clay.

8. A method of claim 1 wherein the pH of the clay slurry is between about 3 and about 7.

9. A method of claim 8 wherein the clay is kaolin.

10. A method of claim 8 or 9 wherein $R^1$ or $R^2$ can be represented by the formula:

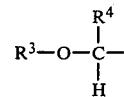

wherein $R^3$ is an alkyl group having 1 to about 4 carbon atoms, and $R^4$ is selected from the group consisting of H, —COOM and methyl.

11. A method of claim 9 wherein $R^1$ and $R^2$ are represented by the formula:

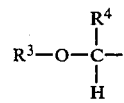

wherein $R^4$ is selected from the group consisting of hydrogen, methyl and —COOM, M is an alkali metal and n averages between about 20 and about 200, and the amount of polymer is between about 0.03 weight percent and about 0.3 weight percent.

* * * * *